(12) United States Patent
Douglas et al.

(10) Patent No.: US 9,878,495 B2
(45) Date of Patent: Jan. 30, 2018

(54) THREE-DIMENSIONAL PRINTING OF LARGE OBJECTS

(71) Applicant: MakerBot Industries, LLC, Brooklyn, NY (US)

(72) Inventors: Ariel Douglas, Brooklyn, NY (US); Theodore Brandston, New York, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 610 days.

(21) Appl. No.: 14/020,658

(22) Filed: Sep. 6, 2013

(65) Prior Publication Data

US 2014/0074274 A1    Mar. 13, 2014

Related U.S. Application Data

(60) Provisional application No. 61/697,999, filed on Sep. 7, 2012.

(51) Int. Cl.
*B29C 64/386*    (2017.01)
*B29C 67/00*    (2017.01)
*B33Y 50/02*    (2015.01)
*B33Y 50/00*    (2015.01)
*B33Y 30/00*    (2015.01)
*B29K 101/12*    (2006.01)

(52) U.S. Cl.
CPC ........ *B29C 67/0088* (2013.01); *B29C 64/386* (2017.08); *B29C 67/0055* (2013.01); *B33Y 50/02* (2014.12); *B29K 2101/12* (2013.01); *B33Y 30/00* (2014.12); *B33Y 50/00* (2014.12)

(58) Field of Classification Search
CPC . A61F 2002/30945; A61F 2002/30947; B29C 67/0051; B29C 67/0055; B29C 67/0085; B29C 67/0088
See application file for complete search history.

(56) References Cited

U.S. PATENT DOCUMENTS

| | | | | |
|---|---|---|---|---|
| 5,121,329 | A * | 6/1992 | Crump | B22F 3/115 228/180.5 |
| 6,165,406 | A * | 12/2000 | Jang | B29C 67/0081 264/308 |
| 8,666,142 | B2 * | 3/2014 | Shkolnik | B29C 67/0088 382/154 |
| 2004/0031780 | A1 * | 2/2004 | Hagemeister | A61C 13/0004 219/121.85 |
| 2004/0165740 | A1 * | 8/2004 | Fang | H04R 25/658 381/312 |

(Continued)

OTHER PUBLICATIONS

"Materialise Software, ""Magics Evisiontec (Version 9.1) 6. Base Software"", Marl, Germany: Updated May 24, 2007, pp. 4:38-5:13 (accessed from https://digfablab.wikispaces.com/file/view/Manual+RP+Part+1+-+Magics +Base.pdf on Jan. 28, 2016)".*

(Continued)

*Primary Examiner* — Kenneth M Lo
*Assistant Examiner* — Michael J Huntley
(74) *Attorney, Agent, or Firm* — Strategic Patents, P.C.

(57) ABSTRACT

A variety of techniques are disclosed for visual and functional augmentation of a three-dimensional printer.

20 Claims, 5 Drawing Sheets

(56) References Cited

U.S. PATENT DOCUMENTS

| | | | | |
|---|---|---|---|---|
| 2007/0201077 | A1* | 8/2007 | Morales | G06F 3/1214 358/1.15 |
| 2010/0173096 | A1* | 7/2010 | Kritchman | B29C 67/0088 427/553 |
| 2010/0186226 | A1* | 7/2010 | Amirparviz | H01L 24/81 29/832 |
| 2011/0009787 | A1* | 1/2011 | Pallari | A61F 5/0102 602/16 |
| 2012/0053716 | A1* | 3/2012 | Bickel | B29C 67/0051 700/98 |
| 2012/0183701 | A1* | 7/2012 | Pilz | B22F 3/1055 427/504 |
| 2012/0258250 | A1* | 10/2012 | Rodgers | B29C 67/0059 427/402 |
| 2013/0297059 | A1* | 11/2013 | Grifith | B29C 67/0088 700/98 |
| 2014/0052415 | A1* | 2/2014 | Baran | G06F 17/50 703/1 |
| 2014/0086704 | A1* | 3/2014 | Hemingway | B33Y 70/00 411/392 |
| 2017/0217088 | A1* | 8/2017 | Boyd, IV | B29C 67/0055 428/117 |

OTHER PUBLICATIONS

Lau, Manfred, et al., "Converting 3D Furniture Models to Fabricate Parts and Connectors", ACM Transactions on Graphics, vol. 30, No. 4, Article 85, Jul. 2011 (accessed from http://dl.acm.org/citation.cfm?id=1964980 on Jan. 28, 2016).*

Nezhad, A. Sanati, et al., "Multi Objective Optimization of Part Orientation in Stereolithography", Proceedings of the 9th WSEAS International Conference on Simulation, Modelling and Optimization, World Scientific and Engineering Academy and Society (WSEAS) Stevens Point, Wisconsin, USA, 2009, pp. 36-40 (accessed on Jan. 29, 2016).*

Materialise Software, "Magics Evisiontec (Version 9.1) 6. Base Software", Marl, Germany: Updated May 24, 2007, pp. 4:38-5:13 (accessed from https://digfablab.wikispaces.com/file/detail/Manual+RP+Part+1+-+Magics+Base.pdf on Jan. 28, 2016, full source document of NPL excerpt attached to prior Office Action).*

Luo, Linjie et al., "Chopper: Partitioning Models into 3D-Printable Parts", http://gfx.cs.princeton.edu/pubs/Luo_2012_CPM/index.php ACM Transactions on Graphics (Proc. SIGGRAPH Asia), Dec. 2012, pp. 1-9.

Carew, Mark et al., "3D FUNPOD", http://phlatboyz.blogspot.com/2012/02/3d-printed-micro-3d-3d-funpod-3d-funpod.html. Feb. 8, 2012, pp. 1-3.

Steele, William, "Ultra-Bot 3D Printer, William Steele", http://www.kickstarter.com/projects/wjsteele/ultra-bot-3d-printer/posts/362119 Dec. 4, 2012, pp. 1-17.

Magics 15.0 Release Report, pp. 1-15, Oct. 19, 2010, Materialise, BE.†

\* cited by examiner
† cited by third party

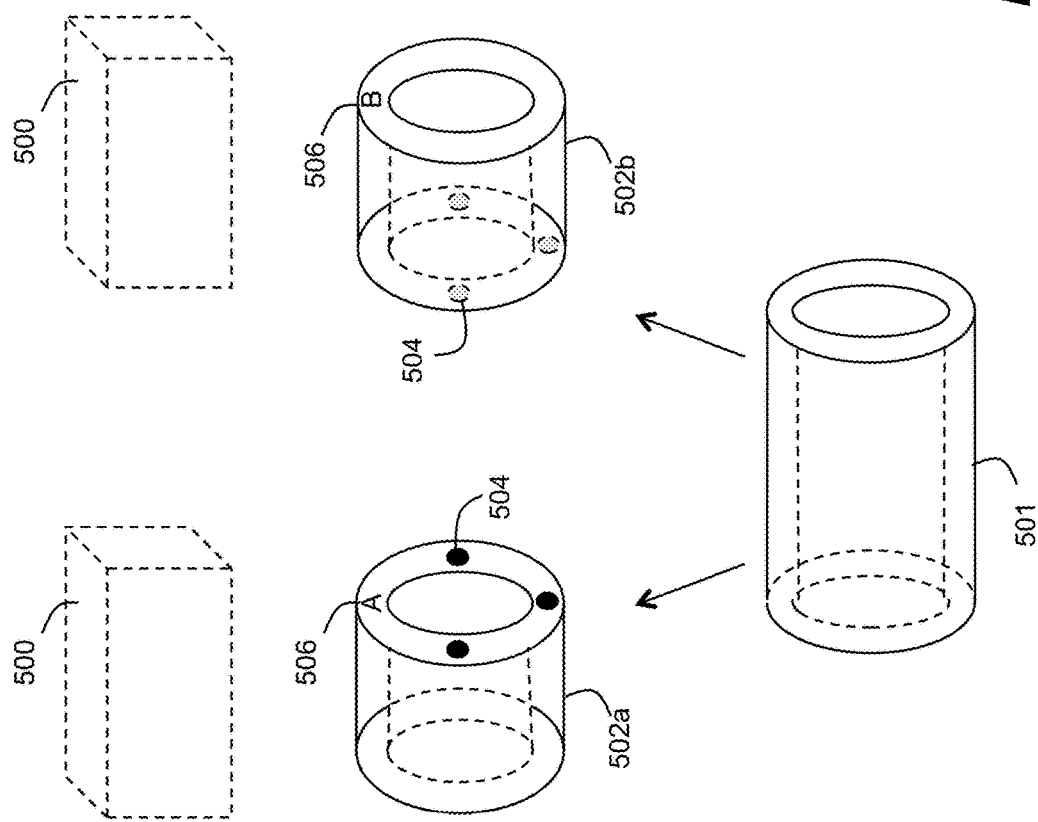

THREE-DIMENSIONAL PRINTING OF LARGE OBJECTS

RELATED APPLICATIONS

This application claims the benefit of U.S. App. No. 61/697,999 filed on Sep. 7, 2012, the entire content of which is hereby incorporated by reference.

BACKGROUND

There remains a need for techniques to three-dimensionally print objects larger than the build volume of a three-dimensional printer.

SUMMARY

A model of an object larger than the build volume of a three-dimensional printer is processed to separate the model into a number of suitably-sized sub-objects, and then features are automatically added to facilitate constructions of the objects into an assembled physical model of the object.

BRIEF DESCRIPTION OF THE FIGURES

The invention and the following detailed description of certain embodiments thereof may be understood by reference to the following figures:

FIG. 5 is a schematic depiction of fabricating an object

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a layered series of two dimensional patterns as "roads," "paths" or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
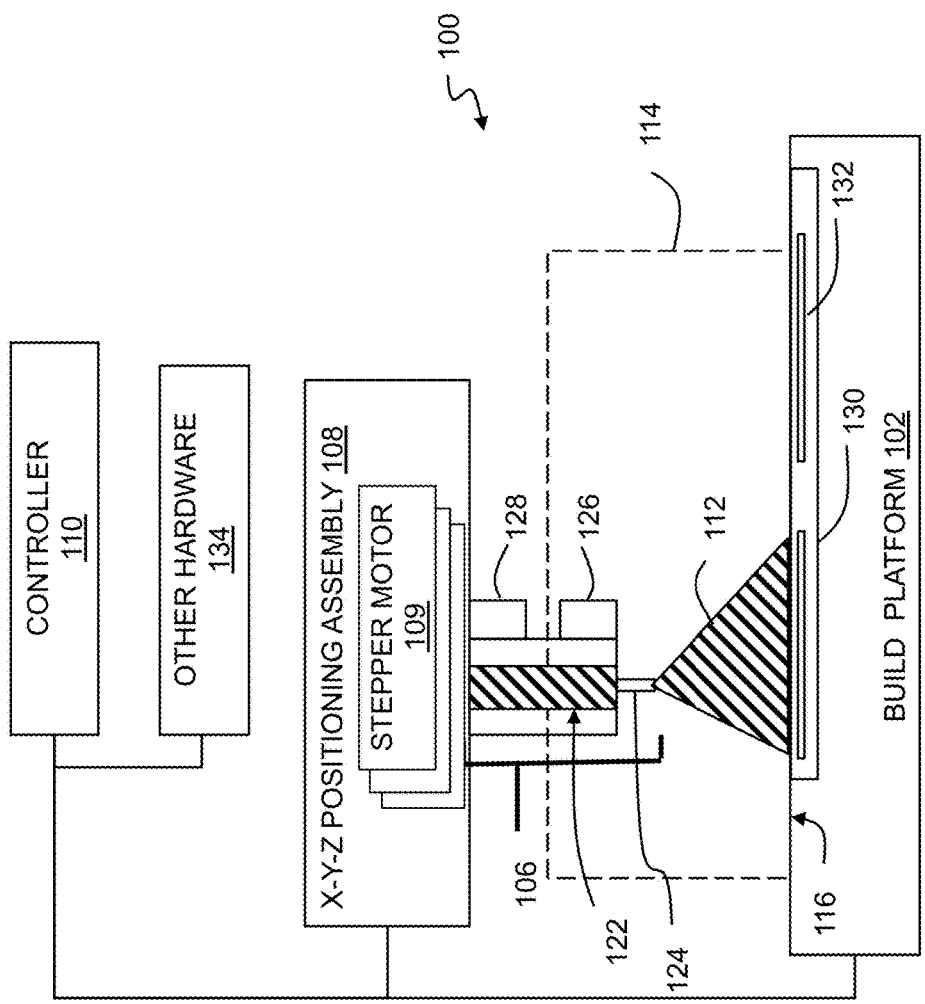
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

Figure 2:
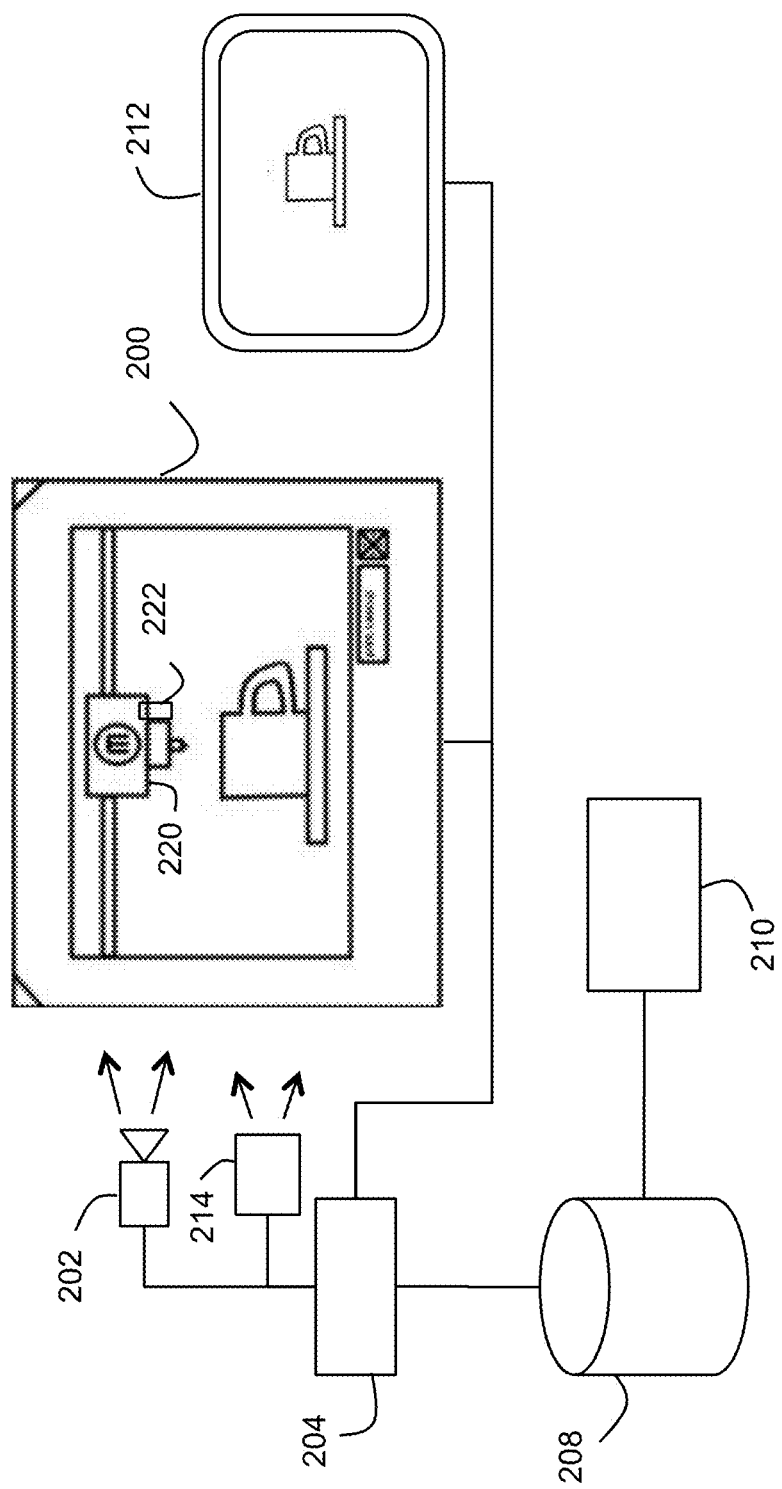
FIG. 2 shows a three-dimensional printer.

FIG. 2 shows a three-dimensional printer. The printer 200 may include a camera 202 and a processor 204. The printer 200 may be configured for augmented operation using two-dimensional data acquired from the camera 202.

The printer 200 may, for example, be any of the three-dimensional printers described above.

The camera 202 may be any digital still camera, video camera, or other image sensor(s) positioned to capture images of the printer 200, or the working volume of the printer 200.

The processor 204, which may be an internal processor of the printer 200, an additional processor provided for augmented operation as contemplated herein, a processor of a desktop computer or the like locally coupled to the printer 200, a server or other processor coupled to the printer 200 through a data network, or any other processor or processing circuitry. In general, the processor 204 may be configured to control operation of the printer 200 to fabricate an object from a build material. The processor 204 may be further configured to adjust a parameter of the printer 200 based upon an analysis of the object in the image. It should be appreciated that the processor 204 may include a number of different processors cooperating to perform the steps described herein, such as where an internal processor of the printer 200 controls operation of the printer 200 while a connected processor of a desktop computer performs image processing used to control print parameters.

A variety of parameters may be usefully adjusted during a fabrication process. For example, the parameter may be a temperature of the working volume. This temperature may be increased or decreased based upon, e.g., an analysis of road dimensions (e.g. height and width of line of deposited build material), or the temperature may be adjusted according to a dimensional stability of a partially fabricated object. Thus, where sagging or other variations from an intended shape are detected, the temperature may be decreased. Similarly, where cooling-induced warping or separation of layers is detected, the temperature may be increased. The working volume temperature may be controlled using a variety of techniques such as with active heating elements and/or use of heated or cooled air circulating through the working volume.

Another parameter that may be usefully controlled according to the camera image is the temperature of a build platform in the working volume. For example, the camera 202 may capture an image of a raft or other base layer for a fabrication, or a first layer of the fabricated object, and may identify defects such as improper spacing between adjacent lines of build material or separation of the initial layer from the build platform. The temperature of the build platform may in such cases be heated in order to alleviate cooling-induced warping of the fabricated object at the object-platform interface.

Another parameter that may be usefully controlled according to an analysis of the camera image is the extrusion temperature of an extruder. By heating or cooling the extruder, the viscosity of a build material may be adjusted in order to achieve a desired material deposition rate and shape, as well as appropriate adhesion to underlying layers of build material. Where roads of material deviate from a predetermined cross-sectional shape, or otherwise contain visible defects, the extrusion temperature of the extruder may be adjusted to compensate for such defects.

Similarly, the parameter may be an extrusion rate of a build material from the extruder. By controlling a drive motor or other hardware that forces build material through the extruder, the volumetric rate of material delivery may be controlled, such as to reduce gaps between adjacent lines of build material, or to reduce bulges due to excess build material.

In another aspect, the parameter may be a viscosity of build material, which may be controlled, e.g., by controlling the extruder temperature or any other controllable element that can transfer heat to and from build material as it passes through the extruder. It will be understood that temperature control is one technique for controlling viscosity, but other techniques are known and may be suitable employed, such as by selectively delivering a solvent or the like into the path of the build material in order to control thermal characteristics of the build material.

Another parameter that may be usefully controlled is a movement speed of the extruder during an extrusion. By changing the rate of travel of the extruder, other properties of the build (e.g., road thickness, spatial rate of material delivery, and so forth) may be controlled in response to images captured by the camera 202 and analyzed by the processor 204.

In another aspect, the parameter may be a layer height. By controlling the z-positioning hardware of the printer 200, the layer height may be dynamically adjusted during a build.

The printer may include a memory 208, such as a local memory or a remote storage device, that stores a log of data for an object being fabricated including without limitation a value or one or more of the parameters described above, or any other data relating to a print. The memory 208 may also or instead store a log of data aggregated from a number of fabrications of a particular object, which may include data from the printer 200 and/or data from a number of other three-dimensional printers.

A second processor 210, such as a processor on a server or other remote processing resource, may be configured to analyze the log of data in the memory 208 to identify a feature of the object that is difficult to print. For example, where a corner, overhang, or the like consistently fails, this may be identified by analysis of the log of data, particularly where such failures can be automatically detected based upon analysis of images from the camera 202. Such failures may be logged in any suitable manner including quantitatively as data characterizing the failure (based upon image analysis), metadata (e.g., percent completion, build parameters, and so forth) and/or a simple failure flag, which may be accompanied by an image of the failed build. In this manner, the second processor 210 can identify features that should be avoided in printable models, and/or objects that are generally difficult or impossible to print. The second processor 210 may also or instead be configured to analyze the results of variations in one or more of the parameters described above. It will be understood that, while the second processor 210 may be usefully located on a remote processing resource such as a server, the second processor 210 may also be the same as the processor 204, with logging and related analysis performed locally by the printer 200 or a locally coupled computer.

The printer 200 may optionally include a display 212 configured to display a view of the working volume. The display 212, which may obtain images of the working volume from the camera 202 or any other suitable imaging hardware, may be configured, e.g., by the processor 204, to superimpose thermal data onto the view of the working volume. This may, for example, include thermistor data or data from other temperature sensors or similar instrumentation on the printer 200. For example, the printer 200 may include sensors for measuring a temperature of at least one of the extruder, the object, the build material, the working volume, an ambient temperature outside the working volume, and a build platform within the working volume. These and any similar instrumentation may be used to obtain thermal data correlated to specific or general regions within and without the printer 200. Where the camera 202 includes an infrared camera, the thermal data may also or instead include an infrared image, or a thermal image derived from such an infrared image.

The display 212 may serve other useful purposes. For example, the view from the camera 202 may be presented in the display. The processor 204 may be configured to render an image of a three-dimensional model used to fabricate an object from the pose of the camera 202. If the camera 202 is a fixed camera then the pose may be a predetermined pose corresponding to the camera position and orientation. If the camera 202 is a moving camera, the processor 204 may be further programmed to determine a pose of the camera 202 based upon, e.g., fiducials or known, visually identifiable objects within the working volume such as corners of a build platform or a tool head, or to determine the pose using data from sensors coupled to the camera and/or from any actuators used to move the camera. The rendered image of the three-dimensional model rendered from this pose may be superimposed on the view of the working volume within the display 212. In this manner, the printer 200 may provide a preview of an object based upon a digital three-dimensional model, which preview may be rendered within the display 212 for the printer, or a user interface of the display, with the as-fabricated size, orientation, and so forth. In order to enhance the preview, other features such as build material color may also be rendered using texture mapping or the like for the rendered image. This may assist a user in selecting build material, scaling, and so forth for an object that is to be fabricated from a digital model.

In another aspect, the printer 200 may optionally include a sensor 214 for capturing three-dimensional data from the object. A variety of suitable sensors are known in the art, such as a laser sensor, an acoustical range finding sensor, an x-ray sensor, and a millimeter wave radar system, any of which may be adapted alone or in various combinations to capture three-dimensional data. The display 212 may be configured to superimpose such three-dimensional data onto the display of the object within the working volume. In this manner, the processor 204 may detect one or more dimensional inaccuracies in the object, such as by comparison of three-dimensional measurements to a digital model used to fabricate the object. These may be presented as dimensional annotations within the display 212, or as color-coded regions (e.g., yellow for small deviations, red for large deviations, or any other suitable color scheme) superimposed on the display of the object. The processor 206 may be further configured to show summary data in the display 212 concerning any dimensional inaccuracies detected within the object.

The sensor 214 may more generally include one or more spatial sensors configured to capture data from the object placed within the working volume. The second processor 210 (which may be the processor 204) may convert this data into a digital model of the object, and the processor 204 may be configured to operate the printer 200 to fabricate a geometrically related object within the working volume based upon the digital model. In this manner, the printer 200 may be used for direct replication of objects simply by placing an object into the working volume, performing a scan to obtain the digital model, removing the object from the working volume, and then fabricating a replica of the object based upon the digital model. More generally, any geometrically related shape may be usefully fabricated using similar techniques.

For example, the geometrically related object may be a three-dimensional copy of the object, which may be a scaled copy, and/or which may be repeated as many times as desired in a single build subject to spatial limitations of the working volume and printer 200. In another aspect, the geometrically related object may include material to enclose a portion of the object. In this manner, a container or other enclosure for the object may be fabricated. In another aspect, the geometrically related object may include a mating surface to the object, e.g., so that the fabricated object can be coupled to the original source object. This may be particularly useful for fabrication of snap on parts such as aesthetic or functional accessories, or any other objects that might be usefully physically mated to other objects. Similarly, a repair piece for a broken object may be fabricated with a surface matched to an exposed surface of the broken object, which surface may be glued or otherwise affixed to the broken object to affect a repair.

The processor 204 may obtain the digital model using, e.g., shape from motion or any other processing technique based upon a sequence of two-dimensional images of an object. The multiple images may be obtained, for example, from a plurality of cameras positioned to provide coverage of different surfaces of the object within the working volume. In another aspect, the one or more spatial sensors may include a single camera configured to navigate around the working volume, e.g., on a track or with an articulating arm. Navigating around the working volume may more generally include circumnavigating the working volume, moving around and/or within the working volume, and/or changing direction to achieve various poses from a single position. The one or more spatial sensors may also or instead include articulating mirrors that can be controlled to obtain multiple views of an object from a single camera.

In another aspect, the one or more spatial sensors 214 may include controllable lighting that can be used, e.g., to obtain different shadowed views of an object that can be interpreted to obtain three-dimensional surface data. The processor 204 (or the second processor 210) may also provide a computer automated design environment to view and/or modify the digital model so that changes, adjustments, additions, and so forth may be made prior to fabrication.

In another aspect, a tool head 220 of the printer may be usefully supplemented with a camera 222. The tool head 220 may include any tool, such as an extruder or the like, to fabricate an object in the working volume of the printer. In general, the tool head 220 may be spatially controlled by an x-y-z positioning assembly of the printer, and the camera 222 may be affixed to and moving with the tool head 220. The camera 222 may be directed toward the working volume, such as downward toward a build platform, and may provide a useful bird's eye view of an object on the build platform. The processor 204 may be configured to receive an image from the camera and to provide diagnostic information for operation of the three-dimensional printer based upon an analysis of the image.

For example, the diagnostic information may include a determination of a position of the tool head within the working volume. The diagnostic information may also or instead include a determination of whether the three-dimensional printer has effected a color change in build material. The diagnostic information may also or instead include a determination of whether the three-dimensional printer has effected a change from a first build material to a second build material. The diagnostic information may also or instead include an evaluation of whether a build material is extruding correctly from the tool head. The diagnostic information may also or instead include an evaluation of whether an infill for the object is being fabricated correctly. In one aspect, the diagnostic information may include the image from the camera, which may be independently useful as a diagnostic tool.

Where the processor 204 is capable of dynamically modifying tool instructions, the processor 204 may be configured to dynamically generate a pattern to infill the object based, for example, on an outline image of the object or previous infilling patterns identified in the image from the camera.

Figure 3:
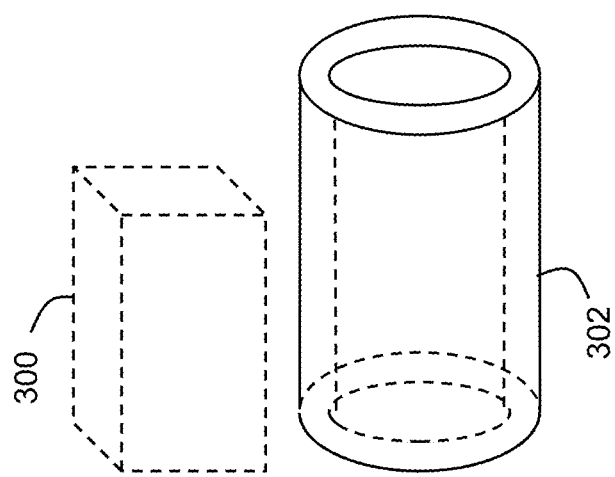
FIG. 3 shows a schematic depiction of an object relative to a build volume.

Referring to FIG. 3, in some cases a user may desire fabricating on object 302 that does not fit within the build volume 300 of a three-dimensional printer. In this case, although the total volume of the object 302 may be less than the build volume 300, the size of at least one dimension of the object (or several dimensions in combination) may exceed the size of available dimensions in the build volume. Thus, it may not be possible to fabricate that particular object 302 using the three-dimensional printer having the build volume 300.

The techniques described herein involve, among other things, modifying the object 300 such that it may be fabricated using one or more three-dimensional printers.

Figure 4:
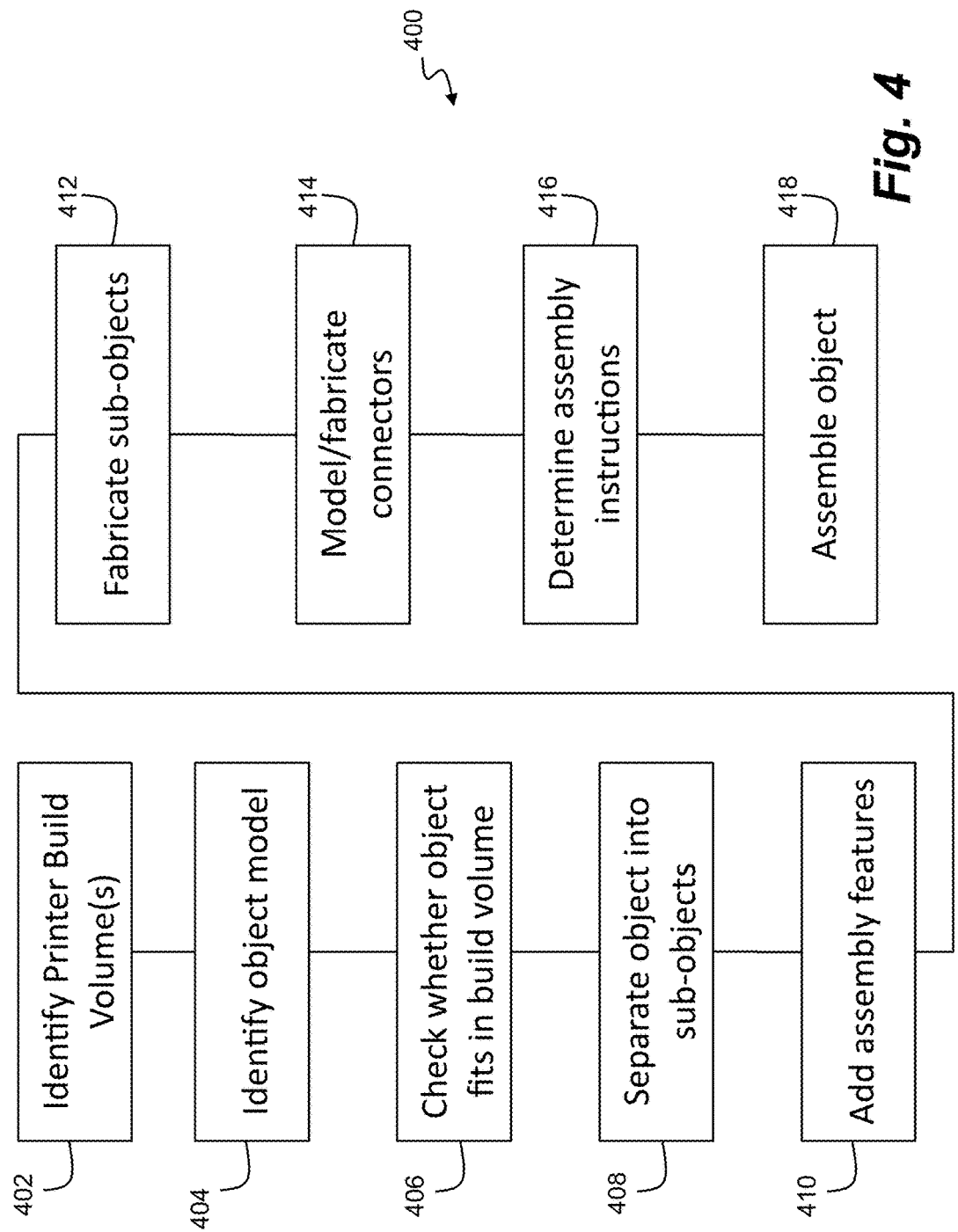
FIG. 4 is a flowchart for fabricating an object

FIG. 4 is a flowchart of a process for fabricating an object, and FIG. 5 is a schematic illustration of an exemplary performance of the process of FIG. 4. The process 400 may begin by identifying the build volume or volumes of an available three-dimensional printer or printers (step 402). In the case of multiple available printers, some build volumes may be the same, although in general, different printers may have different available build volumes. In the example of FIG. 5, the build volume is shown as the cube 500.

In step 404, an object model is identified. The object model may be identified from a single file or multiple files of any available format. Such formats can include, for example, CAD (computer aided design), VRML (virtual reality markup language), STL (stereolithography), PLY (polygon file format), among other file formats. In some implementations, the object model may be identified as the output from a three dimensional scanner. In general, identification here is simply intended to denote receiving, retrieving, creating, or otherwise determining a location of a suitable object model. The example of FIG. 5, the object model identified in step 404 is object 501.

With a model and a build volume identified, an object model may be processed to create a number of sub-objects that can be fit into the build volume (or multiple build volumes). It will be understood that the following steps may be performed in various ways. For example, the processing may be performed on the object model itself to create a number of sub-object models in the same file format, or any other suitable format for describing three-dimensional shapes. These resulting models may then be transmitted to a three-dimensional printer, or to a preprocessor such as a slicing engine for rendering of machine-ready three-dimensional printing code or instructions. In another aspect, the slicing engine (or three-dimensional printer) may perform the processing to separate the object model into sub-object models that are realized directly as machine-ready code. In another aspect, the machine-ready code may include instructions on the optimal arrangement of two or more of the sub-objects on the build platform, e.g., for concurrent fabrication. More generally, the printer may itself perform the partitioning of the object model upon identifying the object model as too large for an available build volume, and use various techniques to optimize this process. Thus a variety of implementations are available according to, e.g., available processing resources, storage capabilities, and desired portability of the resulting models.

In step 406, a check is performed to determine whether the object fits within the build volume of any single available three-dimensional printer. In some implementations, step 406 may include applying rotations to the object model, to determine whether a rotated version of the object may fit inside the build volume. In general, any rotations may be considered in step 406, although in some implementations only certain rotations are considered. These certain rotations may exclude rotations that involve sufficiently unstable orientations of the object during fabrication, e.g., with a curved surface abutting a build platform.

If the object does not fit within a single printer's build volume (or if a user of the three-dimensional printer otherwise instructs), the object may be separated into sub-objects (step 408). In some implementations, the sub-objects may each be associated with particular three-dimensional printers. This step may be performed deterministically, e.g., by simply allocating to printers in the order received, or may be accompanied by additional processing. For example, where numerous printers of different capabilities are available, the sub-objects may be allocated to the printers according to printer capabilities, e.g., with larger parts going to higher-speed printers or with more complex or detailed parts going to higher-resolution printers. In the example of FIG. 5, the object 501 is separated into sub-objects 502a and 502b. In some implementations of step 406, the object may be separated into sub-objects according to one or more criteria.

For example, one criterion that may be employed in step 406 is build time, and the process may separate the object into sub-objects such that a build time associated with each sub-object on a corresponding three-dimensional printer is equal or substantially equal (i.e., equal to within some predetermined interval), taking in to account the possible variation in fabrication capabilities of the various printers. This criterion may be particularly useful to facilitate the fabrication of sub-objects by a number of printers. It will be understood that equalization of print times as contemplated herein does not require that the resulting print times be equal, or even close to equal. In this context, equalization simply requires that the selected size or shape of objects is changed so that the build times for two different sub-objects are closer in duration.

Other criteria that may be employed in step 406 involve criteria that separate the object into sub-objects that each have the same or substantially the same amount of build material; or result in equally- or substantially equally-sized sub-objects. Any of the above criteria can further be modified by accounting for the amount of available build material in each printer without re-loading. Thus, for example, a printer may not be associated with a sub-object if it has insufficient build material to print the object.

Yet other criteria may involve structural considerations of the object assembled from the sub-object. For example, the object may be separated into sub-objects so as to satisfy certain mechanical constraints or tolerances at interfaces between sub-objects, or elsewhere. Still other criteria may be user-provided. For example, a user of the three-dimensional printer may manually partition the object into sub-objects, e.g., using a planar or volumetric editing tool, according to any criteria the user desires. This may allow the user to account for aesthetic considerations, or specific and unusual considerations involving how the object is to be used.

Each of the foregoing criteria may be evaluated to account for certain modifications of the sub-objects, described below. Other criteria are possible, any of which may be realized as a quantitative metric in a cost function or the like to arrive at sub-objects satisfying the desired criteria.

In step 410, assembly features can be added to each sub-object model. In some implementations, the assembly features may include any mechanical couplings or portions thereof. For example, assembly features can include holes on complementary sub-object surfaces, hole/pin combinations on complementary surfaces, protrusions, mating or inter-locking structures, etc. In some implementations, the assembly features may include rough or textured surfaces at corresponding locations between sub-objects, to facilitate the use of externally-supplied glue. In the example shown in FIG. 5, exemplary assembly features are shown including complementary holes on adjacent surfaces of the sub-objects 502a, b.

In some implementations of step 410, couplings of a particular type may be automatically added to the sub-object models. In some implementations, a determination of which type of couplings to add may automatically be performed subject to mechanical constraints or tolerances provided by a user. For example, the dimensions of holes or connectors can be determined based on structural requirements. In some implementations, a user may manually select which couplings to add from a menu of available couplings.

In some implementations, assembly features may also include registration features to uniquely orient one sub-object with respect to another. For example, in FIG. 5, the various holes 504 are asymmetrically distributed about the respective sub-objects 502a, b, so that the holes align only when sub-objects are uniquely oriented with respect to each other. Other registration features may include an asymmetrical arrangement of convex protrusions on one sub-object and corresponding concave protrusions on the corresponding sub-object, which collectively only mate when the sub-objects are uniquely oriented with respect to each other.

Still other registration features need not mechanically constrain the sub-objects. For example, a purely graphical or visual indicator (e.g., using a different color or particular pattern) may be incorporated in corresponding parts of the sub-objects, thereby serving as alignment cues during assembly.

Other assembly features may include unique sub-object identifiers, allowing the sub-objects to be easily distinguished from each other. For example, in FIG. 5, the identifiers 506 are shown. Sub-object 502a bears the identifier "A," while sub-object 502b bears the identifier "B." In some implementations, the identifiers may be included only on mating sub-object surfaces, such that the identifiers are not visible when the sub-objects are assembled. In some implementations, a user may specify the locations or descriptions of the identifiers.

Insofar as some of the assembly features may alter the dimensions of the sub-objects, the addition of the assembly features may be accounted for in previous step 408, such as by providing a margin for registration features when fitting sub-objects to a build volume.

In step 412, the sub-objects may be fabricated into physical instances of their respective models. In some implementations, the fabrication step may include solving a knapsack problem to determine whether two or more sub-objects can be fabricated simultaneously in a single print run on a single three-dimensional printer. The knapsack problem is a well-known problem in combinatorial optimization amenable to a wide array of computational techniques and solutions. Similar problems and solutions have been studied in packing of platonic solids, bin packing, and stock cutting, any of which may provide algorithmic techniques for fitting multiple sub-objects to a single build volume. All such solutions and techniques may be usefully employed to fit sub-objects as contemplated herein.

In step 414, connectors may be modeled and fabricated, if necessary. For example, in implementations of step 412 for which at least some assembly features involve only holes (e.g., as in FIG. 5), then separate connectors dimensioned to fit the holes can be manufactured, either as additional printable objects or as standardized pieces fabricated using some other technique. For example, the holes may be shaped and sized for wooden dowels, standard sized metal pins, custom made die case connectors, or any other suitable connectors. In some implementations, the connectors are manufactured from a build material different from the sub-object build material, such that the fabricated connectors melt at a lower temperature than the sub-objects. Using such connectors, an assembled physical instance of the object may be heated in order to liquefy or partially liquefy connectors to induce bonding to the sub-objects and the creation of a more permanent assembled object.

In step 416, assembly instructions may be determined. The assembly instructions may be written instructions such as words and the like providing step-by-step instructions for assembly. The instructions may also or instead include graphical instructions such as an exploded view or step-by-step graphical assembly diagrams. More generally, the instructions may include any combination of media, e.g., written text, static images, animated video, etc. The assembly instructions may be contain the "reverse" information of the separation of the object into sub-objects. In some implementations, the assembly instructions include a sequence of steps, in which each step specifies the unique identifiers of two sub-objects to be coupled, as well as how many connectors (if any) are required. Thus the instructions, whether written, graphical, or otherwise, may explicitly reference labels fabricated into the various sub-objects for identification.

In step 418, a physical instance of the object may be assembled from the physical instances of the sub-objects. In some implementations, assembling the object may involve placing connectors in corresponding holes between two sub-objects, and heating the combination sub-objects and connectors as described above to a temperature at which the connectors soften or melt but the sub-objects do not.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
providing a first size of a build volume for a three-dimensional printer, the first size including physical dimensions of the build volume;
providing an object model having a second size greater than the first size of the build volume;
separating the object model into a plurality of sub-objects each smaller than the first size of the build volume according to one or more criteria, wherein at least a portion of the plurality of sub-objects are created such that two or more of the plurality of sub-objects can fit collectively into the build volume, with each of the two or more of the plurality of sub-objects in a stable orientation abutting a build platform within the build volume, for combining the two or more of the plurality of sub-objects for fabrication by the three-dimensional printer in a single print;
adding assembly features to the plurality of sub-objects to facilitate a joining of each one of the plurality of sub-objects to at least one other one of the plurality of sub-objects;
adding an identifier to a mating surface of each one of the plurality of sub-objects, the identifier uniquely identifying each sub object to distinguish sub-objects from one another to assist in assembly thereof; and
fabricating a physical instance of each one of the plurality of sub-objects with a three-dimensional printer, thereby providing a plurality of physical sub-objects.

2. The method of claim 1 wherein the one or more criteria includes a build time for each of the plurality of sub-objects, and wherein the plurality of sub-objects are sized to equalize a corresponding build time, thereby facilitating parallel fabrication with a plurality of three-dimensional printers.

3. The method of claim 1 wherein the assembly features include holes.

4. The method of claim 3 wherein the assembly features include complementary holes on adjacent surfaces of two of the plurality of sub-objects, the method further comprising creating a connector model to join the adjacent surfaces of the two of the plurality of sub-objects.

5. The method of claim 4 further comprising fabricating a connector from the connector model with the three-dimensional printer.

6. The method of claim 4 further comprising fabricating the connector from a material having a first melting point lower than a second melting point of a second material used to fabricate the plurality of physical sub-objects.

7. The method of claim 6 further comprising assembling the plurality of physical sub-objects and the connector to form a physical instance of the model.

8. The method of claim 7 further comprising heating the physical instance of the object model to a temperature above the first melting point and below the second melting point.

9. The method of claim 1 wherein the assembly features include one or more registration features to uniquely orient each one of the sub-objects to each other one of the sub-objects when assembled.

10. The method of claim 1 further comprising automatically creating assembly instructions to assemble the plurality of physical sub-objects into a physical instance of the object model.

11. The method of claim 10, wherein the assembly instructions include written instructions referencing the identifier of each of the plurality of sub-objects.

12. The method of claim 1 wherein the one or more criteria includes an amount of build material required to fabricate each one of the plurality of physical sub-objects.

13. The method of claim 1 wherein the one or more criteria include a size of each one of the plurality of physical sub-objects.

14. The method of claim 1 wherein each one of the plurality of sub-objects is smaller than the build volume by at least an amount including a margin for a placement of a convex registration feature.

15. The method of claim 1 further comprising applying the knapsack problem as a dynamic programming method to arrange the two or more of the plurality of sub-objects in the build volume.

16. The method of claim 1, wherein, in the stable orientation, each of the two or more of the plurality of sub-objects has a non-curved surface abutting the build platform.

17. A computer program product comprising non-transitory computer executable code embodied in a computer readable medium that, when executing on one or more computing devices, performs the steps of:
providing a first size of a build volume for a three-dimensional printer, the first size including physical dimensions of the build volume;
providing an object model having a second size greater than the size of the build volume;
separating the object model into a plurality of sub-objects each smaller than the first size of the build volume according to one or more criteria, wherein at least a portion of the plurality of sub-objects are created such that two or more of the plurality of sub-objects can fit collectively into the build volume, with each of the two or more of the plurality of sub-objects in a stable orientation abutting a build platform within the build volume, for combining the two or more of the plurality of sub-objects for fabrication by the three-dimensional printer in a single print;
adding assembly features to the plurality of sub-objects to facilitate a joining of each one of the plurality of sub-objects to at least one other one of the plurality of sub-objects;
adding an identifier to a mating surface of each one of the plurality of sub-objects, the identifier uniquely identifying each sub object to distinguish sub-objects from one another to assist in assembly thereof; and
transmitting the plurality of sub-objects to a three-dimensional printer for fabrication of a corresponding plurality of physical sub-objects.

18. The computer program product of claim 17 wherein the one or more criteria includes a build time for each of the plurality of sub-objects, and wherein the plurality of sub-objects are sized to equalize a corresponding build time, thereby facilitating parallel fabrication with a plurality of three-dimensional printers.

19. The method of claim 15 further comprising applying the knapsack problem to select additional objects from among the plurality of sub-objects to combine with the two or more of the plurality of sub-objects for fabrication by the three-dimensional printer in a single print.

20. The computer program product of claim 17 further comprising automatically creating assembly instructions to assemble the plurality of physical sub-objects into a physical instance of the object model, wherein the assembly instructions include written instructions referencing the identifier of each of the plurality of sub-objects.

* * * * *